United States Patent [19]

Hiesinger et al.

[11] Patent Number: 4,831,396
[45] Date of Patent: May 16, 1989

[54] OBJECTIVE FOR PHOTOGRAPHIC CAMERAS

[75] Inventors: Reinhard Hiesinger, Ottobeuren; Werner Tobler, Aitrach, both of Fed. Rep. of Germany

[73] Assignee: Firma Novoflex Fotogeratebau Karl Muller, Memmingen, Fed. Rep. of Germany

[21] Appl. No.: 143,044

[22] Filed: Jan. 12, 1988

[30] Foreign Application Priority Data

Feb. 27, 1987 [DE] Fed. Rep. of Germany ....... 3706409

[51] Int. Cl.$^4$ ................................................ G03B 1/18
[52] U.S. Cl. ............................ 354/195.1; 354/195.12; 350/255; 350/430
[58] Field of Search ...................... 354/195.1, 195.12; 350/427–430, 255

[56] References Cited

U.S. PATENT DOCUMENTS

| 2,920,545 | 1/1960 | Kellner | 354/195.1 X |
| 2,938,444 | 5/1960 | Kellner | 350/429 X |
| 3,827,061 | 7/1974 | Kellner | 354/195.1 |
| 3,877,048 | 4/1975 | Kellner | 354/195.1 |

FOREIGN PATENT DOCUMENTS

| 1026612 | 3/1958 | Fed. Rep. of Germany ... 350/429 X |
| 1033503 | 7/1958 | Fed. Rep. of Germany ... 354/195.1 X |
| 2229444 | 1/1974 | Fed. Rep. of Germany ... 354/195.1 |
| 2236344 | 2/1974 | Fed. Rep. of Germany ... 354/195.1 |
| 2832522 | 2/1980 | Fed. Rep. of Germany . |

*Primary Examiner*—L. T. Hix
*Assistant Examiner*—David M. Gray
*Attorney, Agent, or Firm*—Holman & Stern

[57] ABSTRACT

An objective for a photographic camera is mounted on a carrier having a squeezable handle by which the focusing device can be actuated. The objective has a zoom facility and may also have a macro facility which is actuated by the camera acting on the zoom facility or the macro facility by means of a sliding or a turning movement.

2 Claims, 2 Drawing Sheets

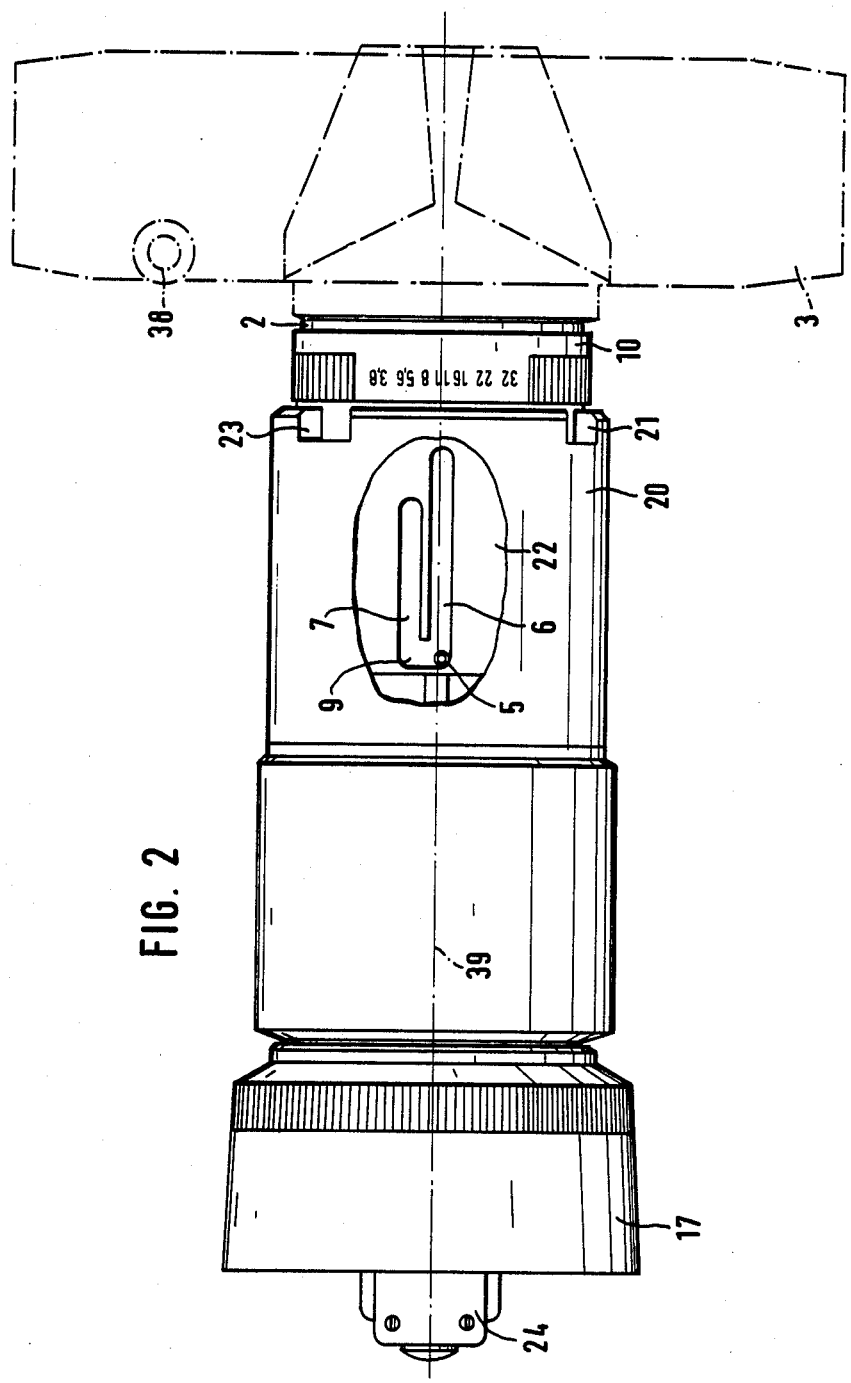

OBJECTIVE FOR PHOTOGRAPHIC CAMERAS

FIELD OF THE INVENTION

The invention concerns an objective (by which is meant a lens assembly, and herein termed an "objective") for photographic cameras, having an objective housing, a focusing device on the front part of the objective and having a zoom facility, and if required also a macro facility, controllable by a sliding movement, in the direction of the optical axis of the objective relative to the objective housing, of a connecting element arranged at the end of the objective nearer the camera, which element serves to connect the objective with the camera.

DESCRIPTION OF THE PRIOR ART

Objectives having a zoom facility, and if required also a macro facility, of the type set out hereinbefore, are known. Such objectives are used in the following way: the objective is supported by one hand at the objective housing, while the other hand of the operator operates the camera. Adjustment of the desired focal distance when using a zoom facility, or of the desired enlargement when using a macro facility, is performed by a sliding movement of the camera towards the objective housing. In order to change from operation of the zoom facility to operation of the macro facility, the camera is turned through a small angle relative to the objective housing, so that in each case the facility being used becomes effective and the other facility becomes inoperative.

For the purpose of focusing, these known objetives have at the front end of the objective an adjusting ring which permits screw movement. This screw movement is indirectly or directly transferred to the focusing part of the objective lenses, thus enabling fine adjustment.

These known objectives and their relevant cameras are troublesome to use. While one hand supports the camera, the other hand has to operate not only the focusing device at the front end but also the shutter and the release, and possibly also the zoom facility at the rearward end of the objective. In the case of moving objects, fine adjustment can become impossible, particularly when e.g., the zoom facility has to be adjusted subsequently.

The invention has as an object to find an arrangement which considerably facilitates and accelerates operation of such an objective and its relevant camera.

SUMMARY OF THE INVENTION

To solve this problem, a start is made from an objective of the kind set out in the opening paragraph of this specification. According to the invention it is proposed that the objective housing be mounted on a carrier having a handle consisting of two parts which are compressible together against a restoring force and which acts on a slidable sleeve of the objective movable in the direction of the optical axis and carrying the focusing part of the objective lenses.

This problem is solved by the invention in a surprisingly simple way. One hand of the operator supports the objective by means of the carrier and also actuates the focusing device while the other hand of the operator actuates the zoom facility or the macro facility and also operates the camera. This hand can also actuate the shutter without any substantial change in the position of the hand on the camera being necessary.

Thus both hands can support the camera and the objective, since the position of the hand on the camera need not be changed substantially and in particular need not actuate the focusing device.

In the practical use of such an objective and a camera it is further found that the focusing device can be operated at the same time that the zoom facility is actuated, thus enabling a sharply-defined picture to be quickly obtained. As the camera cn be released without changing the hand position, operating time is considerably shortened. This has a considerable advantage when photographing moving objects, for example when taking sports pictures and the like.

There is a further advantage which has an effect particularly with regard to the taking of macro photographs. In taking macro photographs, the distance between the object and the objective is relatively small. If living animals are to be photographed, movement of the hand to the front end of the objective or to a device for fine adjustment often spoils the picture.

Use of a carrier for supporting an objective, and actuating a focusing device by a compressible handle, is known per se. Hitherto, however, such a device has been used with objectives having relatively long focal distances and corresponding weight, and has served merely to accelerate focusing. This invention however has a further advantage, that, when using a relatively light objective, such objectives having a zoom facility can be provided with a sliding arrangement which actuates both the focusing and the zoom or macro facility.

A further feature of the invention provides a sliding sleeve enclosing the objective housing. Although this means that a part of the length of the objective housing is lost for the purpose of support by the carrier, this mode of construction permits a simple coupling of the movement of the movable handling part with the slidable sleeve of the focusing part.

In particular, the invention proposes that one part of the handle be connected with a carriage which is movable on the carrier and acts on the slidable sleeve with a pin extending from the carriage and engaging said one part of the handle; and preferably two spaced stops are mounted on the outside of the slidable sleeve, between which the pin engages.

BRIEF DESCRIPTION OF THE DRAWINGS

The drawing is a diagrammatic representation of an embodiment of an objective for use on a camera in accordance with the invention. In the drawing, FIG. 2 shows a top view of the objective shown in FIG. 1.

DESCRIPTION OF THE PREFERRED EMBODIMENT

Figure 1:
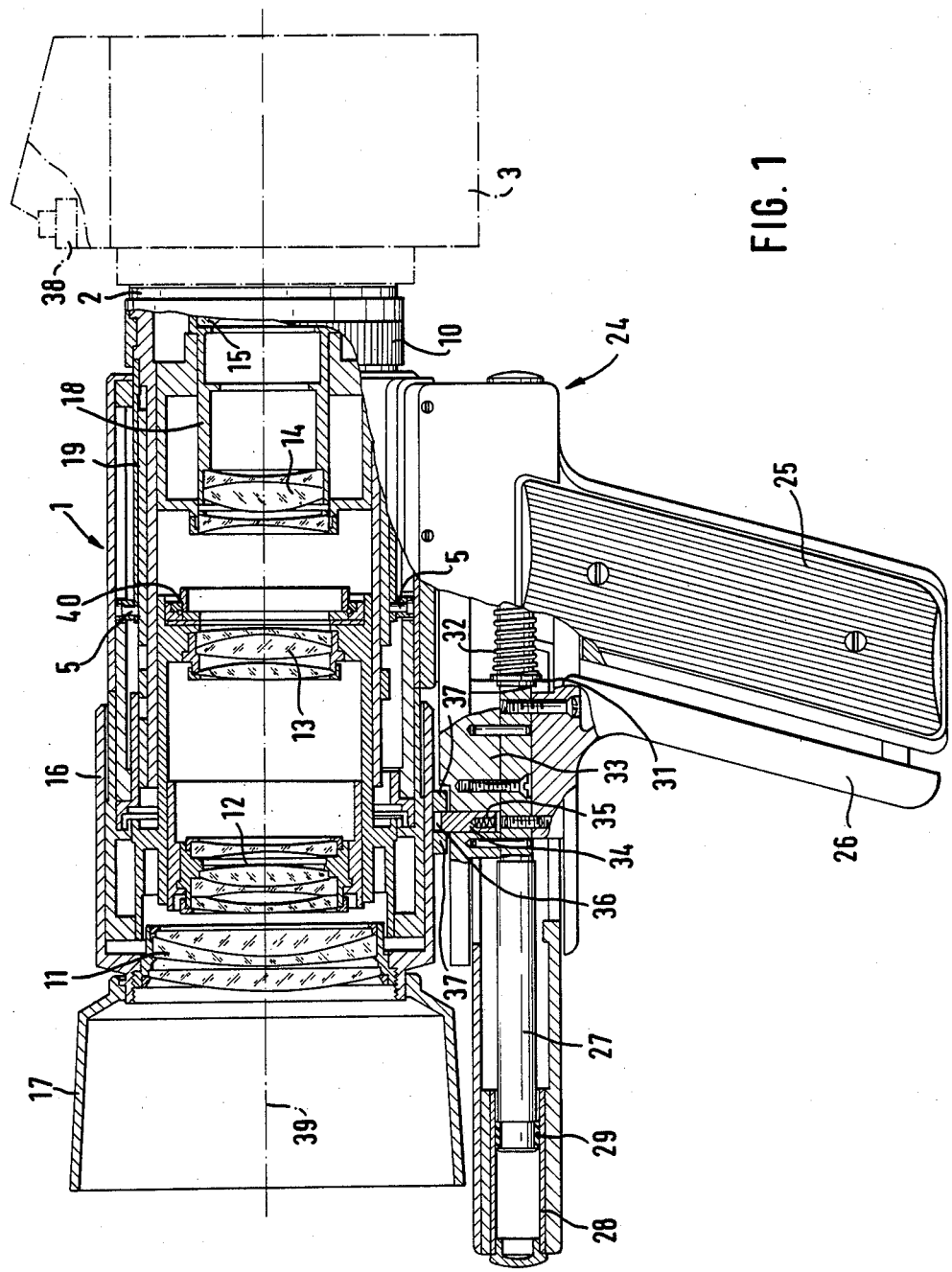
FIG. 1 is a side view, partly in section, of the objective according to the invention.

In the drawing, the camera 3 is indicated by chain lines. The camera is attached to the connecting ring 2 of the objective 1, for example by being screwed into this ring or else held by means of a bayonet attachment. A ring 10 for adjusting the automatic shutter 40 of the objective 1 is arranged on the connecting ring 2.

The objective 1 shown has, as is known per se, a zoom facility and also a macro facility. The objective 1 consists of a total of five sets of lenses. The lens set 11 serves for focusing. It is carried by a sliding sleeve 16 to which is also secured a sun shield 17.

In the central region of the objective 1 there are lens sets 12 and 13 which are displaceable relative to each other and also to the other sets of lenses. The lens sets 14 and 15 are accommodated together in a displaceable sleeve 18. The lens setse 12, 13, 14 and 15 represent essentially the zoom facility and serve to alter the focal distance.

An objective structure of the type described so far is known per se. If the zoom facility is to be used, the lens sets 12, 13 and the sleeve 18 with the lens sets 14 and 15 are displaced relative to each other. If the macro facility is actuated, the camera 3 only is displaced towards the rear in the direction of the optical axis 39, the focal distance being unchangeable. The mechanical elements for actuating the zoom or the macro facility are however not fully represented in the drawing. These mechanical elements, which, regarded separately, are known, are driven in the embodiment of this invention, via the connecting ring 2 or the sleeve-shaped extension 19. On this extension 19 there are two guide pins 5 (see also FIG. 2) which are each movable in longitudinal slots 6 and 7. By a rotary movement on the camera 3, the connecting ring 2, which is firmly connected therewith, can be turned so that each guide pin 5 is aligned with either a slot 6 or a slot 7. When the guide pins 5 move in the slots 6, the macro facility is actuated. When the guide pins 5 move in the slots 7, the zoom facility is actuated.

On the housing 20, which encloses both the extension 19 and the sleeve 22 in which the longitudinal slots 6 and 7 are provided, there are recesses 21 and 23. If the guide pins 5 are aligned with the slots 6, a marking is visible in the recess 21 to indicate that the macro facility is actuated. If however the guide pins 5 are aligned with the slots 7, the relevant focal distance of the lens can for example be read in the recess 23.

In the embodiment shown, the longitudinal slots 6 and 7 are joined together at their ends 9 in such a way that, in the appropriate position of the objective, a change can be made from actuation of the macro facility to actuation of the zoom facility. In the embodiment shown, the zoom facility is in the position having the shortest focal distance. In the case of other objectives the arrangement may be different. This is not essential for an understanding of the invention.

The objective 1 with its housing 20 is mounted on a carrier 24 which has a handle consisting of two parts 25 and 26. The part 26 of the handle is held on a guide rod 27 which is displaceably mounted with its two ends in the carrier 24. One mounting, which is shown in section, consists essentially of a fixed sleeve 28 in which the rod 27 with a sliding member 29 slides.

On a collar 31 of the guide rod 27 there is supported a spring 32 which is located on an abutment in the interior of the carrier 24.

When the parts 25 and 26 of the handle squeezed together, the guide rod 27 is displaced against the force of the spring 32 and the spring 32 pushes the guide rod 27 forward in a direction paralell to the optical axis when the handle is released.

The guide rod 27 is connected with a carriage 33. A pin 34 is mounted in the carriage 33 and is pressed towards the objective 1 by a small spring 35. The pin 34 thereby engages in a recess 36 between two stops 37 on the sliding sleeve 16 of the lens. By compression of the handle which consists of the parts 25 and 26, the sliding sleeve 16 together with the first lens set 11 is moved and the objective 1 can be focused.

In use of the objective according to the invention, the operator holds the handle comprising the parts 25 and 26 with one hand and thus is able to actuate the focusing device, that is to say the sliding sleeve 16 for the first lens set 11, and grasps the camera 3 with the other hand with one finger on the release 38. With the hand holding the camera 3, the operator by a pushing or a turning movement is able to actuate the macro facility or the zoom facility of the objective 1 as desired.

What we claim as our invention and desire to secure by Letters Patent of the U.S. is:

1. An objective for a photographic camera, the objective including an objective housing; a focusing device in said objective; means in said objective providing a zoom facility and a connecting element at one end of said objective for connecting said objective to a camera, said connecting element being movable in the direction of an optical axis of the objective relative to said objective housing to enable said zoom facility to be actuated, a carrier on which said objective housing is mounted; a two-part handle having one part fixed to said carrier and the other part movable towards said one part when said handle is gripped in one hand by an operator; a slidable sleeve surrounding the objective housing, said sleeve being movable in the direction of the optical axis and carrying said focusing device, restoring means acting to urge said two parts of said handle apart, said two parts of said handle being squeezable in said one hand against the action of said restoring means to effect sliding of said sleeve and actuation of said focusing device; a carriage on which said one part of the handle is mounted, the carriage being movable with respect to said carrier, a pin mounted in said carriage and extending therefrom, two spaced stops mounted on the outside of said sleeve, said pin engaging between said stops for sliding the sleeve to provide actuation of the focussing device, and the objective also including means providing a macro facility, said connecting element being movable in the direction of the optical axis of said objective relative to said objective housing to enable said macro facility to be actuated, and selector means in said objective housing having two alternative settings of which one corresponds to said zoom facility and the other corresponds to said macro facility, said selector means being selectively movable into each of said settings whereby one only of said zoom and macro facilities is actuated for each setting.

2. An objective as claimed in claim 1 in which said selector means comprises a further sleeve positioned coaxially within said objective housing and having thereon two altenrative slots of unequal length and each extending parallel to said optical axis of said objective and spaced apart in the circumferential direction of said further sleeve and a pin fixed with respect to said connecting element and selectively engageable in one or other of said slots on turning said connecting element with respect to said objective housing about said optical axis.

* * * * *